US012410707B2

(12) United States Patent
Donzier et al.

(10) Patent No.: US 12,410,707 B2
(45) Date of Patent: Sep. 9, 2025

(54) DEVICE FOR ACQUIRING AND SENDING DATA BETWEEN OIL OR GAS WELL STRINGS

(71) Applicant: VALLOUREC OIL AND GAS FRANCE, Aulnoye-aymeries (FR)

(72) Inventors: Eric Donzier, Meudon (FR); Emmanuel Tavernier, Meudon (FR)

(73) Assignee: VALLOUREC OIL AND GAS FRANCE, Aulnoye-aymeries (FR)

( * ) Notice: Subject to any disclaimer, the term of this patent is extended or adjusted under 35 U.S.C. 154(b) by 0 days.

(21) Appl. No.: 18/682,640

(22) PCT Filed: Jul. 27, 2022

(86) PCT No.: PCT/FR2022/051508
§ 371 (c)(1),
(2) Date: Feb. 9, 2024

(87) PCT Pub. No.: WO2023/017219
PCT Pub. Date: Feb. 16, 2023

(65) Prior Publication Data

US 2024/0344452 A1 Oct. 17, 2024

(30) Foreign Application Priority Data

Aug. 10, 2021 (FR) ....................................... 2108620

(51) Int. Cl.
*E21B 47/13* (2012.01)
*H01Q 1/22* (2006.01)

(52) U.S. Cl.
CPC ............... *E21B 47/13* (2020.05); *H01Q 1/22* (2013.01)

(58) Field of Classification Search
CPC .......... E21B 47/13; E21B 47/017; H01Q 1/22
See application file for complete search history.

(56) References Cited

U.S. PATENT DOCUMENTS 9,413,571 B2 * 8/2016 Jin ...................... H04L 25/4902
2008/0174309 A1 * 7/2008 Pusiol .............. G01R 33/56308 324/306
2010/0071894 A1 * 3/2010 Benischek .............. E21B 43/16 137/13

(Continued)

FOREIGN PATENT DOCUMENTS

WO WO-2014167330 A2 * 10/2014 ........... E21B 47/122
WO WO-2020025667 A1 * 2/2020 ............. E21B 47/01

OTHER PUBLICATIONS

International Search Report mailed on Dec. 1, 2022 in PCT/FR2022/051508 filed on Jul. 27, 2022.

*Primary Examiner* — Amine Benlagsir
(74) *Attorney, Agent, or Firm* — Oblon, McClelland, Maier & Neustadt, L.L.P.

(57) ABSTRACT

A tubular component for a well pipe including a transmitting antenna, a first reading antenna axially spaced apart from the transmitting antenna by a distance D, excitation electronics connected to the transmitting antenna and arranged to emit an electromagnetic field E having a first electromagnetic characteristic, reading electronics connected to the first reading antenna and arranged to detect temporal and intentional variations in the electromagnetic field according to the first characteristic.

16 Claims, 1 Drawing Sheet

(56) References Cited

U.S. PATENT DOCUMENTS

| | | | | |
|---|---|---|---|---|
| 2013/0060487 | A1* | 3/2013 | Papadimitriou | G10L 15/22<br>702/34 |
| 2015/0061665 | A1* | 3/2015 | Reiderman | G01N 24/081<br>324/303 |
| 2016/0281496 | A1 | 9/2016 | Hyland et al. | |
| 2017/0003413 | A1* | 1/2017 | Jachmann | G01R 33/3873 |
| 2018/0003040 | A1* | 1/2018 | Roberson | E21B 47/13 |
| 2019/0346385 | A1* | 11/2019 | Reiderman | G01R 33/583 |
| 2020/0217192 | A1* | 7/2020 | Li | G01R 33/383 |
| 2020/0319367 | A1* | 10/2020 | Xing | E21B 47/002 |
| 2020/0319372 | A1* | 10/2020 | Jachmann | G01V 13/00 |
| 2021/0103071 | A1* | 4/2021 | Jachmann | G01V 3/38 |
| 2021/0310350 | A1 | 10/2021 | Dubois-Decool et al. | |
| 2022/0365242 | A1* | 11/2022 | Jachmann | G01R 33/50 |

* cited by examiner

DEVICE FOR ACQUIRING AND SENDING DATA BETWEEN OIL OR GAS WELL STRINGS

TECHNICAL FIELD

The invention relates to oil and/or gas wells, $CO_2$ storage wells, and more specifically to a device for acquiring and transmitting data in wells, which can relate to a drill string, a casing or tubing pipe string or even a production pipe string.

TECHNOLOGICAL BACKGROUND

An oil or gas well generally comprises a plurality of tubular strings. It comprises at least two, a casing string and a tubing string. More often, a well structure comprises two or more casing strings and a tubing string. The spaces between two adjacent tubular strings or between the largest diameter tubular string of a well and the rock formation are called annular spaces. These annular spaces can be at least partially filled with cement or wall filling and retention fluids. It is worthwhile monitoring the physical or chemical parameters in these spaces, such as pressure and temperature, pH, dihydrogen sulphide concentration, carbon dioxide concentration, chlorides or water, so as to detect abnormal events in the well, such as a leak, an unwanted rise in fluid or gas or the appearance of operating conditions not anticipated at the time of construction.

The pipes used in the construction of oil or gas wells are generally made of steel, and include long pipes, i.e., over 6 metres long, and shorter pipes, called sleeves, connecting the long pipes together. The corresponding threaded connections are called threaded & coupled (T&C) connections. Long pipes also exist that are directly connected to each other via connections called integrals, where female and male parts are produced in the same pipe.

The tubular casings are intended to be used for several years in an oil or gas well. Ageing resistance is studied in depth according to the steel grade that is used, the characteristics of the pipes and their connections, and also the environmental and operating conditions of the equipment. A requirement exists for monitoring changes in environmental and operating conditions in the well.

Monitoring devices using cables installed on the pipes are known, but these solutions are difficult to install, particularly for casing strings.

Document US 2018/058208 discloses a device for transmitting data along a drill string using acoustic waves transmitted through the pipe wall.

This device does not allow data to be transmitted between strings in the same well, nor does it allow various annular spaces in a well to be monitored.

Document WO 2020/025667 discloses a device for acquiring and sending data between oil or gas well pipes.

These known devices do not allow the various annular spaces of a well to be monitored.

The known devices do not allow the conditions in the well to be monitored at different depths and for various annular spaces of the well. A requirement exists for a device that allows an operator to monitor parameters relating to the operating conditions of equipment in various annular spaces and for this device to allow data relating to the conditions in various annular spaces to be retrieved without major dismantling operations or without having to install complex equipment at the wellhead or bottom hole. In the prior art, connection devices are known that are intended to be used in gas or oil wells, comprising a first tubular element, a second tubular element and a coupling sleeve for sealably coupling the first and second tubular elements together. Each of the tubular elements comprises a male threaded portion that is screwed into a female threaded portion of the coupling sleeve.

SUMMARY

One idea behind the invention is to propose an energy or data transmission device that allows a communication to be established with a lower energy expenditure for an element of the transmission device.

According to one embodiment, the invention provides a tubular component for a well pipe comprising a transmitting antenna, a first reading antenna axially spaced apart from the transmitting antenna by a distance D, excitation electronics connected to the transmitting antenna and arranged for the transmitting antenna to generate an electromagnetic field having a first electromagnetic characteristic, reading electronics connected to the first reading antenna and arranged to detect temporal and intentional variations in the electromagnetic field according to said first characteristic. Thus, it is possible to set up a communication between the tubular component and an external element, which communication is based on intentional disturbances of the magnetic field emitted by the transmitting antenna, with the disturbances being able to be measured by the first reading antenna over time. The reading electronics are arranged to reconstruct a data message based on temporal variations in the magnetic field according to the first considered characteristic, with said variations being induced by the disturbances.

Advantageously, the first characteristic can be selected from among: a frequency or wavelength, the amplitude, a force or amplitude on the first reading coil or on another reading coil such as a second reading coil, an intensity, an intensity or frequency phase modulation. These characteristic quantities allow disturbances of the magnetic field to be measured. The reading electronics can be arranged to separate the intentional disturbances of the electromagnetic field generated by the transmitting antenna that are induced by an external element communicating with the tubular component, and the unintentional disturbances induced by the environment, with the latter being able to generate disturbances with unanticipated values, for example, values that are not within the expected frequency range or values that would not be within the expected amplitude range, i.e., ranges of values for the first considered characteristic that are not expected.

According to a preferred aspect, the magnetic field E has a frequency ranging between 500 Hz and 1.5 KHz, which frequency range is particularly well suited to the ranges of magnetic fields sought after within the scope of the present application of the invention.

According to one aspect, the magnetic field E has a frequency ranging between 10 kHz and 15 KHz, which frequency range is particularly well suited to the ranges of magnetic fields sought after within the scope of the present application of the invention.

According to one aspect, the distance D separating the transmitting antenna 2 and the first reading antenna is at least equal to half an axial length of the transmitting coil. This relationship ensures a minimum range allowing the introduction of an element outside the tubular component that generates intentional disturbances of the magnetic field E.

The external element capable of establishing a communication by disturbing the magnetic field emitted by the first component can be a second tubular component belonging to another string of tubular elements and comprising a transmitting antenna. More advantageously, the distance D separating the transmitting antenna from the reading antenna can be such that the distance D is greater than a distance separating the transmitting antenna and a transmitting antenna of the second tubular component on the other string. If the reading antenna is too close to the transmitting antenna, the reception antenna risks picking up the electromagnetic field not disturbed by an external element. If the reading antenna is too far away from the transmitting antenna, then the reading antenna risks no longer being able to pick up the electromagnetic field.

According to one embodiment, the transmitting antenna and the first reading antenna can be eccentric relative to the axis of the tubular component. Surprisingly, the communication solutions of the prior art between well components located at substantially the same depth only disclose antennas in the form of windings wound around tubular components, and therefore windings centred on the tubular component. Having eccentric transmission and reading antennas allows easier integration on the tubular component, and allows the tubular component to be more easily integrated into a pipe string communication system compared to the systems of the prior art.

According to one embodiment, the tubular component can comprise an axial groove in an outer lateral surface, the transmitting antenna and the reading antenna can be at least partially located inside said axial groove. Thus, the transmission and reading antenna assembly can be integrated eccentrically relative to the axis of the tubular component and can be protected from damage that can be caused by the environment.

According to one embodiment, the transmitting antenna and the reading antenna can be collinear. The transmitting antenna and the reading antenna, which are in the form of windings or wire windings, each have a respective axis and these axes are substantially collinear. This facilitates the integration of the antennas and increases the range of the magnetic field relative to the transmission and reading antennas.

According to one embodiment, the transmitting antenna and the reading antenna are not collinear, with the reading antenna being in a radial position forming an angle with the radial position of the transmitting antenna viewed from the axis of the tubular component, of more than 60° and less than 120°. Tests have shown that the magnetic field range is greater in this configuration.

According to one embodiment, the tubular component can comprise a second reading antenna. Advantageously, the second reading antenna can be at a second distance D' from the transmitting coil. Advantageously, this second reading antenna can be collinear with the transmitting antenna and with the first reading antenna. Advantageously, the second reading antenna can be located on the opposite side to the first reading antenna relative to the transmitting coil. This allows the range of a communication with an external element to be increased, from the axial perspective, and this allows a depth offset to be provided between the tubular component and the second tubular component of another pipe string of the well or of a communicating element in the rock formation, in order to establish a communication between these elements.

According to one embodiment, the transmitting antenna, the first reading antenna, the second reading antenna if present, the excitation electronics and the reading electronics can be located in a protective pipe at least partially mounted in the axial groove. Preferably, the protective pipe can be made of Inconel. This facilitates the integration of the components on the tubular component, in addition to the protection provided by the protective pipe. The integration of the elements in a communicating string is also facilitated.

Alternatively, both the transmitting antenna and the reading antenna can be located in a protective pipe located on the outer surface of the tubular component, i.e., also outside an axial groove. This can dispense with having to use a non-magnetic material for the tubular component without attenuating the communication range of the device.

According to one embodiment, the protective pipe can be held in place by clamps. Advantageously, the clamps are mounted in recesses in the outer surface of the component and are arranged to hold the protective pipe on the tubular component. This limits the external dimensions of the tubular component.

According to another embodiment, the antennas can be attached to the tubular component by a clamping device, the antennas are mounted on the clamping device, and then the clamping device is mounted on the outer surface of the tubular component.

According to one embodiment, the tubular component can include at least one connector arranged to connect the excitation electronics and/or the reading electronics to a well telemetry system. The connectors can include connection electronics arranged to establish a two-way communication between a well telemetry system and the excitation and reading electronics. With the tubular component aiming to establish a communication with an external element, for example, comprising sensors, the tubular component according to the invention can retrieve the measured data and transmit it to the well telemetry system.

According to one embodiment, the tubular component can be a tubing element. Thus, the tubular component according to the invention can be integrated into a communicating tubing string, or a communication line.

According to one embodiment, the tubular component can be a casing element. Thus, the tubular component according to the invention can be integrated into a casing string.

The invention also relates to a data transmission device comprising a first tubular component according to one of the preceding embodiments, and comprising a second tubular component comprising transmitting electronics connected to a transmitting antenna, said transmitting antenna being positioned so as to electromagnetically interact with the transmitting antenna, the transmitting electronics and the transmitting antenna being arranged to intentionally and temporally modify the first electromagnetic characteristic of the electromagnetic field emitted by the transmitting antenna, thereby creating or generating a data message transmitted from the second tubular component to the first tubular component.

According to one embodiment of the device, the first tubular component is on a first tubular string and the second tubular component is on a second tubular string. The first tubular string can be a tubing string and the second tubular string can be a casing string, or the first tubular string and the second tubular string can be casing strings.

The invention also relates to a method for transmitting data and/or energy between pipe strings of an oil or geothermal well comprising a transmission device according to an embodiment described above, comprising the steps of:

- the transmitting antenna emitting an electromagnetic field having a first electromagnetic characteristic;
- temporally and intentionally modifying the magnetic field with the first characteristic into an electromagnetic field with a first characteristic modified by the action of the transmitting electronics and the transmitting antenna, the transmitting electronics temporally modifying the impedance of the electrical circuit of the transmitting antenna 22;

the reading antenna receiving the magnetic field with the first modified characteristic;

the reading electronics reconstructing a data message based on the time variations of the first characteristic and of the first modified characteristic of the magnetic field.

BRIEF DESCRIPTION OF THE FIGURES

The invention will be better understood, and further aims, details, features and advantages thereof will become more clearly apparent throughout the following description of several particular embodiments of the invention, which are provided solely by way of a non-limiting illustration, with reference to the appended drawings, in which.

DESCRIPTION OF THE EMBODIMENTS

In the description and figures, the X axis corresponds to the screwing axis of the tubular elements of the connection device. By convention, the "radial" orientation is orthogonal to the X axis and the axial orientation is parallel to the X axis. The terms "external" and "internal" are used to define the relative position of an element, with reference to the X axis, an element close to the X axis is thus described as internal as opposed to an external element that is radially located on the periphery.

Figure 1:
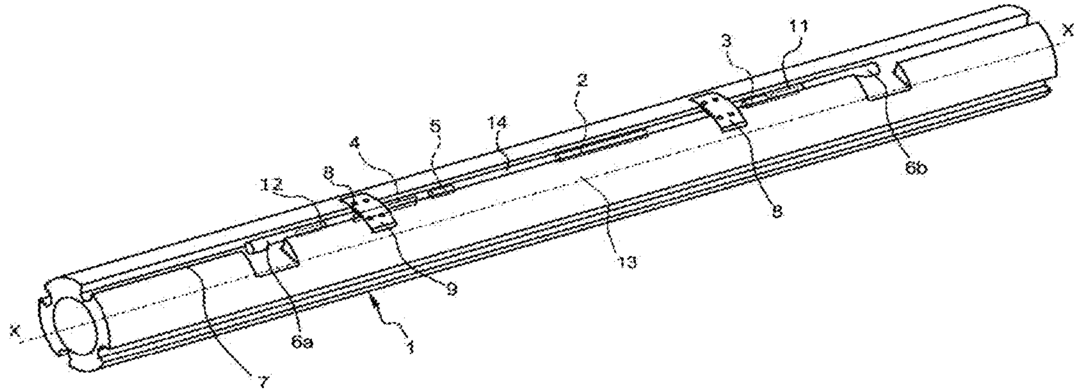
FIG. 1 is a cross-sectional view of a tubular component according to one embodiment.

FIG. 1 shows a portion of the tubular component 1 according to one embodiment of the invention. The tubular component 1 is intended to be able to be connected upstream and downstream of a pipe string forming a well tubing or casing. The connection means that can be present at the ends of the component are not shown. These connection means can be threaded connections that are otherwise known in the field, for example, API connections or semi-premium or premium VAM© connections.

The tubular component 1 comprises an axial groove 7 formed in an outer lateral surface 13. The component can include other axial grooves, preferably evenly distributed over the circumference, so as to improve the distribution of mechanical stresses in the tubular component 1.

Excitation electronics 4 connected to a transmitting antenna 2 are installed in the axial groove 7. The excitation electronics 4 are arranged to be able to inject a current into the transmitting antenna 2 so that the transmitting antenna 2 generates a magnetic field E. The magnetic field E has a first characteristic selected from among the frequency, the wavelength or the amplitude. The transmitting antenna 2 comprises a winding around a substantially axial axis.

The tubular component 1 also comprises reading electronics 11 connected to a first reading antenna 3. In this embodiment, the tubular component 1 also comprises a second reading antenna 5. The first reading antenna 3 and the second reading antenna 5 are located at a first distance D and at a second distance D' from the transmitting antenna. This distance is less than a limit corresponding to the range of the electromagnetic field that the transmitting antenna can generate. The reading antenna (3; 5) is a winding that is shorter than the winding length of the transmitting antenna 2. The reading antenna (3; 5) has a winding with a substantially axial axis. In this embodiment, the second reading antenna 5 is identical to the first reading antenna 3. The first reading antenna 3 and the second reading antenna 5 are located on either side of the transmitting antenna 2, and are substantially aligned with the transmitting antenna 2.

Advantageously, the transmitting antenna 2, the first reading antenna 3 and the second reading antenna 5 are located inside a protective pipe 14. This protective pipe is made of a non-magnetic alloy, such as Inconel. The protective pipe 14 also houses the reading electronics 11 and the excitation electronics 4.

The tubular component 1 in FIG. 1 also comprises two connectors 6*a*, 6*b* located on either side of the protective pipe 14. These connectors are arranged to electrically connect the tubular component to other electronic elements of the string on which the tubular component 1 is mounted, for example, a telemetry line installed on the tubular string. These connectors are connected to interface electronics 12, which are arranged to establish communication between excitation electronics 4 and reading electronics 11 with a string communication system and ultimately a surface interface.

The protective pipe 14 is held in the axial groove 7 by two clamps 8. The two clamps are inserted into corresponding recesses 9 produced in the outer lateral surface 13, so as not to protrude from the outer lateral surface 13 of the tubular component 1, and so as not to increase the external overall dimensions of the tubular component 1.

Figure 2:
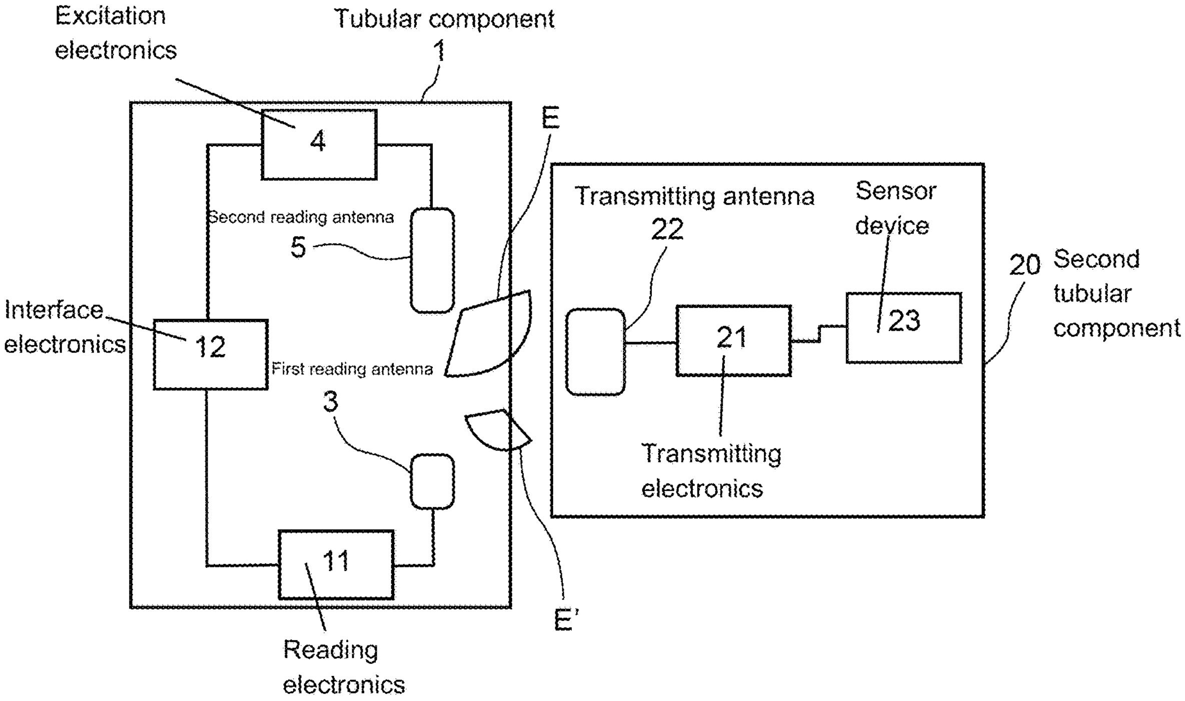
FIG. 2 is a schematic view of a data transmission device according to one embodiment of the invention.

FIG. 2 schematically shows a communication device according to the invention, comprising a tubular component 1, for example, produced according to the embodiment described above, comprising excitation electronics 4 connected to a transmitting antenna 2, reading electronics 11 connected to a reading antenna 3, interface electronics 12 connected to the excitation electronics and to the reading electronics. The excitation electronics 4 are connected to the transmitting antenna 2 and are arranged to cause the transmitting antenna 2 to generate an electromagnetic field E with a first characteristic, with said first characteristic being selected from among the frequency, the force or the amplitude at a point, with the point being the first reading coil 3 or the second reading coil 5, an intensity, an intensity or frequency phase modulation.

FIG. 2 also shows a second tubular component 20, located at substantially the same depth as the tubular component 1. The second tubular component 20 is mounted on a tubular string separate from the tubular string on which the tubular component 1 is mounted. The first tubular component 1 is axially located inside the second tubular component 20. The transmitting antenna 22 is positioned so as to electromagnetically interact with the transmitting antenna 2.

The second tubular component 20 comprises a transmitting antenna 22, transmitting electronics 21, as well as a sensor device 23. The transmitting electronics 21 are arranged to modify the impedance of the electrical circuit of the transmitting antenna 22. For example, the transmitting electronics 21 can short-circuit the transmitting antenna 22 for periods of time. The transmitting antenna 22 therefore can have at least two impedance states: a first impedance state I1 and a second impedance state I2 when the antenna is short-circuited. These two states therefore allow a data bit to be formed. As the transmitting antenna 22 is positioned so as to electromagnetically interact with the transmitting antenna 2, the magnetic field is altered by the presence of the transmitting antenna 22, and the magnetic field E has two states, depending on the first considered characteristic, depending on whether the transmitting antenna 22 has a first impedance I1 or a second impedance I2 different from the first impedance I1. The transmitting electronics 21 and the transmitting antenna 22 vary the electromagnetic field E over time and vary the current induced in the reading coil 3.

The transmitting electronics 21 comprise a battery and at least one sensor, for example, a temperature sensor, a pressure sensor, an acoustic sensor. The transmitting electronics store the measurements taken by the at least one sensor in a memory. The transmitting electronics 21 are arranged to generate a data message comprising measurements taken by the at least one sensor, and the transmitting electronics 21 are arranged to modify the impedance of the electrical circuit of the transmitting antenna 22 corresponding with said data message, generating corresponding variations in the magnetic field E, and generating corresponding intentional variations in induced current in the measuring coil 3, with said intentional variations in induced current representing the data message.

In other words, the transmitting electronics 21 encode a data message by successive transitions of the transmitting antenna 22 through high impedance states and low impedance states, for predefined durations.

In practice, the transmitting antenna 22 is positioned so as to be within the range of the magnetic field E generated by the transmitting antenna. The mere presence of the transmitting antenna 22 in the magnetic field modifies said magnetic field emitted by the transmitting antenna. By transitioning from a high impedance state to a low impedance state, for example, by short-circuiting the transmitting antenna 22, for example, with a relay, and without moving the transmitting antenna 22, the magnetic field E is modified from a magnetic field E with a first characteristic to a disturbed magnetic field E with a modified first characteristic.

The reading antenna 3 located at a distance D from the transmitting antenna 2 is located within the range of the magnetic field E, a current is induced in the reading antenna 3 and the reading electronics 11 are arranged to measure the time variations of the first characteristic of the magnetic field E. Thus, the modifications provided by the impedance states of the transmitting antenna 22 to the magnetic field E, i.e., the variations in the first characteristic, can be recorded by the reading electronics 5, which are arranged to decode the message encoded by the transmitting electronics 21. A data message is therefore transmitted from the second tubular component 20 to the first tubular component 1, while preventing the transmitting antenna 22 of the second tubular component 20 from generating a magnetic field. Therefore, this communication is energy-efficient.

In other words, the reading electronics 11 are arranged to convert the intentional variations in induced current into a transmitted data message. Therefore, data has been transmitted from the tubular component 20 to the tubular component 1. This data is formatted by the interface electronics 12. The interface electronics 12 are connected to a string communication system. This communication system is not part of the present invention. Such a string communication system can rely on wired cable transmission, or wireless transmission, for example, by acoustic waves, or on electromagnetic waves.

According to one aspect, when the transmitting antenna 2 emits an electromagnetic field E, this electromagnetic field reaches the transmitting antenna 22 and a current is generated in the transmitting electronics 21. Three functions can be implemented: generating energy transmission in order to power the transmitting electronics, optionally powering the battery of the transmitting electronics 21; generating a data message transmitted from the excitation electronics 4 to the transmitting electronics 21, i.e., from the tubular component 1 to the second tubular component 20; generating a transmission start signal for the transmitting electronics 21 so that the transmitting electronics transmit data with the means and according to the process described in the preceding paragraphs.

Although the invention has been described in connection with several particular embodiments, it is quite clear that it is by no means limited thereto and that it includes all the technical equivalents of the means described, as well as their combinations if they fall within the scope of the invention.

The use of the verbs "comprise", "include" or "incorporate" and the conjugated forms thereof does not exclude the presence of elements or steps other than those set forth in a claim.

In the claims, any reference sign between brackets should not be understood to be a limitation of the claim.

The invention claimed is:

1. A data transmission device comprising:

a first tubular tool comprising:

an axis, a transmitting antenna, a first reading antenna axially spaced apart from the transmitting antenna by a distance D, excitation electronics connected to the transmitting antenna and arranged for the transmitting antenna to generate an electromagnetic field E having a first electromagnetic characteristic, reading electronics connected to the first reading antenna and arranged to detect intentional variations in the electromagnetic field E over time according to said first electromagnetic characteristic, and a second tubular tool comprising:

transmitting electronics connected to a second transmitting antenna, the second transmitting antenna being positioned so as to electromagnetically interact with the transmitting antenna, the transmitting electronics and the second transmitting antenna being arranged to intentionally and temporally modify the first electromagnetic characteristic of the electromagnetic field E emitted by the transmitting antenna, and thereby generating a data message transmitted from the second tubular tool to the first tubular tool, wherein the first reading antenna receives a disrupted electromagnetic field E with the modified first electromagnetic characteristic, and the reading electronics reconstructs the data message based on the intentional variations in the disrupted electromagnetic field E over the time according to said first electromagnetic characteristic and of the modified first electromagnetic characteristic of the disrupted electromagnetic field E.

2. The data transmission device according to claim 1, wherein the first electromagnetic characteristic is selected from among: a frequency, an amplitude on the first reading antenna, an intensity, an intensity or frequency phase modulation.

3. The data transmission device according to claim 1, wherein the electromagnetic field E has a frequency ranging between 500 Hz and 1.5 KHz.

4. The data transmission device according to claim 1, wherein the distance D separating the transmitting antenna and the first reading antenna is at least equal to half an axial length of the transmitting antenna.

5. The data transmission device according to claim 1, wherein the transmitting antenna and the first reading antenna are eccentric relative to the axis of the first tubular tool.

6. The data transmission device according to claim 1, further comprising an axial groove in an outer lateral surface, and the transmitting antenna and the first reading antenna are at least partially located inside the axial groove.

7. The data transmission device according to claim 6, further comprising a second reading antenna, collinear with the first reading antenna, and wherein the transmitting antenna, the first reading antenna, the second reading antenna, the excitation electronics and the reading electronics are located in a protective pipe mounted in the axial groove.

8. The data transmission device according to claim 7, further comprising at least two clamps of a plurality of clamps in recesses in the outer lateral surface arranged to hold the protective pipe mounted in the axial groove on the first tubular tool.

9. The data transmission device according to claim 1, wherein the transmitting antenna and the first reading antenna are collinear.

10. The data transmission device according to claim 1, further comprising a second reading antenna, collinear with the first reading antenna.

11. The data transmission device according to claim 1, wherein the first reading antenna is in a first radial position forming an angle with a radial position of the transmitting antenna, viewed from the axis of the first tubular tool, of more than 60° and less than 120°.

12. The tubular compoent data transmission device according to claim 1, further comprising at least one connector of a plurality of connectors arranged to connect the excitation electronics and/or the reading electronics to a well telemetry system.

13. The data transmission device according to claim 1, wherein the transmitting antenna extends around the first tubular tool and the first reading antenna is eccentric relative to the axis of the first tubular tool.

14. The data transmission device according to claim 1, wherein the first tubular tool is a tubing element or a casing element.

15. The data transmission device according to claim 1, wherein the first tubular tool is on a first tubular string and the second tubular tool is on a second tubular string.

16. A method for transmitting data and/or energy between pipe strings of an oil or geothermal well with steps of:

transmitting the data and/or the energy between the pipe strings, wherein a transmission device comprising: a first tubular tool comprising: an axis, a transmitting antenna, a first reading antenna axially spaced apart from the transmitting antenna by a distance D, excitation electronics connected to the transmitting antenna and arranged for the transmitting antenna to generate an electromagnetic field E having a first electromagnetic characteristic, reading electronics connected to the first reading antenna and arranged to detect intentional variations in the electromagnetic field E over time according to said first electromagnetic characteristic, and a second tubular tool comprising: transmitting electronics connected to a second transmitting antenna, the second transmitting antenna being positioned so as to electromagnetically interact with the transmitting antenna, and thereby generating a data message transmitted from the second tubular tool to the first tubular tool;

emitting the electromagnetic field E having the first electromagnetic characteristic from the transmitting antenna;

temporally and intentionally modifying the first electromagnetic characteristic of the electromagnetic field E into a disrupted electromagnetic field E with a modified first electromagnetic characteristic, wherein to modify the first electromagnetic characteristic by action of the transmitting antenna and the second transmitting antenna, the transmitting antenna temporally modifying an impedance of an electrical circuit of the second transmitting antenna;

receiving the modified first electromagnetic characteristic of the disrupted electromagnetic field E by the first reading antenna;

reconstructing the data message by the reading electronics based on the intentional variations in the disrupted electromagnetic field E over the time according to said first electromagnetic characteristic and of the modified first electromagnetic characteristic of the disrupted electromagnetic field E.

* * * * *